United States Patent
Cho (10) Patent No.: US 10,325,157 B2
(45) Date of Patent: Jun. 18, 2019

(54) SHADOW REMOVAL METHOD AND SYSTEM FOR A MOBILE ROBOT CONTROL USING INDOOR SURVEILLANCE CAMERAS

(71) Applicant: GACHON UNIVERSITY OF INDUSTRY-ACADEMIC COOPERATION FOUNDATION, Seongnam-si, Gyeonggi-do (KR)

(72) Inventor: Young-Im Cho, Seoul (KR)

(73) Assignee: Gachon University of Industry-Academic Cooperation Foundation, Seongnam-si (KR)

( * ) Notice: Subject to any disclaimer, the term of this patent is extended or adjusted under 35 U.S.C. 154(b) by 57 days.

(21) Appl. No.: 15/442,284

(22) Filed: Feb. 24, 2017

(65) Prior Publication Data

US 2017/0249517 A1 Aug. 31, 2017

(30) Foreign Application Priority Data

Feb. 25, 2016 (KR) ........................ 10-2016-0022723

(51) Int. Cl.
*G06K 9/00* (2006.01)
*G06T 5/00* (2006.01)
*G06T 5/20* (2006.01)

(52) U.S. Cl.
CPC .......... *G06K 9/00771* (2013.01); *G06T 5/002* (2013.01); *G06T 5/005* (2013.01);
(Continued)

(58) Field of Classification Search
CPC combination set(s) only.
See application file for complete search history.

(56) References Cited

U.S. PATENT DOCUMENTS 9,193,303 B2 * 11/2015 Higgins-Luthman ..... B60R 1/00
2015/0336014 A1 * 11/2015 Stenzler ................ A63G 33/00
472/137

(Continued)

FOREIGN PATENT DOCUMENTS

JP 2005-103680 A 4/2005
JP 2012-215959 11/2012

OTHER PUBLICATIONS

Korean Notice of Allowance dated Nov. 10, 2017 of the corresponding Korean Patent Application No. 10-2016-0022723.

(Continued)

*Primary Examiner* — Behrooz M Senfi
(74) *Attorney, Agent, or Firm* — Lewis Roca Rothgerber Christie LLP (57) ABSTRACT

A mobile robot to which a shadow removal method and system for surveillance camera-based mobile robot control according to the present invention is applied acquires images from two closely installed surveillance cameras indoors and performs shadow removal at an improved speed compared to the conventional speed, to recognize the obstacle in the image to avoid it and travel.

It is anticipated that through the mobile robot using the surveillance camera-based shadow removal method and system of the present invention, the practical use of an intelligent image surveillance system that can automatically analyze images and recognize a dangerous situation to take quick action may be accelerated.

12 Claims, 10 Drawing Sheets

(52) U.S. Cl.
CPC ............... *G06T 5/008* (2013.01); *G06T 5/20* (2013.01); *G06K 9/00805* (2013.01); *G06T 2207/20032* (2013.01); *G06T 2207/30232* (2013.01); *G06T 2207/30236* (2013.01)

(56) References Cited

U.S. PATENT DOCUMENTS

| | | | |
|---|---|---|---|
| 2016/0050397 A1* | 2/2016 | Di Giamberardino | ..................... H05B 37/0227 315/149 |
| 2018/0040209 A1* | 2/2018 | Lim | ..................... G08B 5/22 |

OTHER PUBLICATIONS

Collins, et al., "A System for Video Surveillance and Monitoring," Carnegie Mellon University Robotics Institute Technical Report CMU-RI-TR-00-12, pp. 1-68, 2000.

Cucchiara et al., "Detecting Objects, Shadows and Ghosts in Video Streams by Exploiting Color and Motion Information," Proc. IEEE International Conference Image Analysis and Processing, pp. 360-365, 2001.

Horprasert et al., "A Statistical Approach for Real-time Robust Background Subtraction and Shadow Detection," Proc. IEEE International Conference on Computer Vision, pp. 1-19, 1999.

Hwang, et al., "A Shadow Region Suppression Method using Intensity Projection and Converting Energy to Improve the Performance of Probabilistic Background Subtraction," Journal of Institute of Control, Robotics and Systems, vol. 16, No. 1, pp. 69-76, Jan. 2010.

Kilger et al., "A Shadow Handler in a Video-based Real-time Traffic Monitoring System," Proc. IEEE Workshop on Applications of Computer Vision, pp. 11-18, 1992.

Mikic et al., "Moving Shadow and Object Detection in Traffic Scenes," Proc. International Conference on Pattern Recognition, vol. 1, pp. 321-324, 2000.

Prati, et al., "Analysis and Detection of Shadows in Video Streams: A Comparative Evaluation," Proc. IEEE Conference on Computer Vision and Pattern Recognition, pp. 571-576, 2001, DOI: 10.1109/CVPR.2001.991013.

KIPO Office Action dated Mar. 15, 2017 with English translation and of the corresponding Korean Patent Application No. 10-2016-0022723 (9 pages).

Kim, et al., "Removing Shadows Using Background Features in the Images of a Surveillance Camera", Journal of Institute of Control, Robotics and Systems, 2013, pp. 202-208, vol. 19(3), Daegu University.

Shim, et al., "A Shadow Removal Method for a Mobile Robot Localization using External Surveillance Cameras," The 12th International Conference on Mobile Systems and Pervasive Computing (MobiSPC 2015), Procedia Computer Science, pp. 1-6, Aug. 18, 2015.

\* cited by examiner

Camera 1

Camera 2

FIG. 10

SHADOW REMOVAL METHOD AND SYSTEM FOR A MOBILE ROBOT CONTROL USING INDOOR SURVEILLANCE CAMERAS

CROSS-REFERENCE TO RELATED APPLICATION(S)

This application claims the priority of Korean Patent Application No. 10-2016-0022723 filed on Feb. 25, 2016, and all the benefits accruing therefrom under 35 U.S.C. § 119, the contents of which is incorporated by reference in its entirety.

BACKGROUND OF THE INVENTION

1. Field of the Invention

The present invention relates to an image processing method for controlling a mobile robot, and more particularly, to a method for removing shadows from a captured image using two indoor surveillance cameras.

2. Description of the Related Art

In general, Video Surveillance (VS) is a computer vision technology that automatically processes video images of a camera installed to view specific areas of interest, for security or traffic management and such given purposes, and recently, it has been attracting the attention of many researchers.

The main use of such VS is to detect dynamic objects such as vehicles or people in video images, to classify the types of objects, and to analyze and understand motion.

The first step in VS is to extract the foreground in the image, and in the extracted foreground, other than the dynamic object which is the object of interest, its shadow is also included. At this time, the foreground appears different from the original form of the object, which can lead to errors in subsequent procedures such as classification or recognition. For this reason, a variety of techniques have been studied for detecting shadows in an image to eliminate the shadow (Non-Patent Document 1).

Prati et al. (Non-Patent Document 2) discloses that it has been reported that when existing shadow detection techniques were classified into a statistical parametric (SP) technique (Non-Patent Document 3) and a statistical non-parametric (SNP) technique (Non-Patent Document 4), and a deterministic model-based (DM) method (Non-Patent Document 5) and a deterministic non-model based (DNM) method, and they were experimented, the DNM method using color information showed the most stable and good results.

The DNM technique proposed by Cucchiara et al. (Non-Patent Document 6) uses a threshold value to detect a pixel value change by a shadow in an HSV (Hue Saturation Value) color space. The HSV color space is most similar to human color recognition, and the brightness V and the colors H and S are separated, which is advantageous for detecting shadow pixels.

Prati et al. compared conventional techniques for detecting shadows in video images. As a result, the DNM technique showed the most stable result among various techniques in various cases. The technique of Cucchiara et al. was a pixel-based DNM technique, and first, a RGB (Red Green Blue) color image of a camera was converted into an HSV color image according to the following Equations 21, 22, and 23.

$$H = \begin{cases} \theta, & \text{if } B \leq G \\ 360 - \theta, & \text{if } B > G \end{cases} \quad \text{[Equation 21]}$$

$$\text{when } \theta = \cos^{-1} \frac{\frac{1}{2}[(R-G) + (R-B)]}{[(R-G)^2 + (R-B)(G-B)]^{\frac{1}{2}}}$$

$$S = 1 - \frac{3}{(R+G+B)}[\min(R, G, B)] \quad \text{[Equation 22]}$$

$$V = \frac{1}{3}(R + G + B) \quad \text{[Equation 23]}$$

Then, in the number t-th frame of the converted video image, if any pixel p in the foreground satisfies all three conditions of Equation 24 below, it was determined to belong to the shadow region SH.

$$p \in sh \text{ if } C_1 \wedge C_2 \wedge C_3 \quad \text{[Equation 24]}$$

$$\text{when } C_1: \alpha \leq \frac{I_V^t(p)}{B_V^t(p)} \leq \beta$$

$$C_2: I_S^t(p) - B_S^t(p) \leq \tau_S$$

$$C_3: |I_H^t(p) - B_H^t(p)| \leq \tau_H$$

Here, ^ means logical product, I(p) is a value at the foreground of a pixel p, and B(p) is a value at the background of a pixel p. Also, lower subscripts were used to denote the H, S, or V color values of a pixel, and $\alpha$, $\beta$, $\tau S$ and $\tau H$ are the thresholds used for determination. These thresholds are appropriately determined by trial and error by a user so that the shadow pixels can be appropriately extracted from images used for learning. Equation 22 means that although the V value of the pixel changes somewhat greatly within a certain range, when the values of S and H do not change greatly, it is judged that that pixel is shadowed. In other words, shadows cause the brightness of the pixel to be significantly lowered without greatly changing the color of the pixel.

When it comes to location recognition and control of an image-based mobile robot, the recognition and removal of shadows occurring in images are very important. Shadows created by objects in an environment where the mobile robot moves cause incorrect feature point extractions or image analysis errors. Generally, for shadow removal of objects, a background image removal method is widely used. This method has high accuracy but is disadvantageous in that it requires a large amount of calculation. In addition, since the shadow component produced by indoor illumination remains on the image with the background removed, it needs to be further removed to obtain accurate object information. Therefore, many studies for shadow removal are focused on developing algorithms with high computation speed.

So far, mainly two researches for removing shadows from a background area, using spatial information and using color information, are being widely used. The method of using spatial information judges the shadow by using the property that the shadow has a flatter boundary than the moving object. This method has a disadvantage that although it is possible to remove the shadow with a relatively high accuracy, it is time-consuming because it requires a large amount of calculation. Since a real-time video surveillance system needs to handle advanced functions such as tracing moving objects for several tens of frames per second or more, in the end, a large amount of computation acts as a great burden. As a method capable of solving the problem of the large amount of calculation, there is a method of using color information. This method is based on the fact that the shadow region has the same color as the background model but a difference in brightness occurs. The method using color information is suitable for a real-time video surveillance system because it can remove shadows with only a relatively simple operation.

As prior arts, there are Non-Patent Document 1: M. Hwang and D. J. Kang, "A shadow region suppression method using intensity projection and converting energy to improve the performance of probabilistic background subtraction," Journal of Institute of Control, Robotics and Systems, vol. 16, no. 1, pp. 69-76, 2010; Non-Patent Document 2: A. Prati and R. Cucchiara, & quot; Analysis and detection of shadows in video streams: a comparative evaluation, & quot; Proc. IEEE Conference on Computer Vision and Pattern Recognition, pp. 571-576, 2001, Non-Patent Document 3: I. Mikic, P. C. Cosman, G. T. Kogut, and M. M. Trivedi, "Moving shadow and object detection in traffic scenes," Proc. International Conference on Pattern Recognition, vol. 1, pp. 321-324, 2000; Non-Patent Document 4: T. Horprasert, D. Harwood, and L. Davis, "A statistical approach for real-time robust background subtraction and shadow detection," Proc. IEEE International Conference on Computer Vision, pp. 1-19, 1999; Non-Patent Document 5: M. Kilger, & quot; A shadow handler in a video-based real-time traffic monitoring system, & quot; Proc. IEEE Workshop on Applications of Computer Vision, pp. 11-18, 1992; Non-Patent Document 6: Cucchiara, C. Grana, M. Piccardi, and A. Prati, "Detecting objects, shadows and ghosts in video streams by exploiting color and motion information," Proc. IEEE International Conference on Image Analysis and Processing, pp. 360-365, 2001; and Non-Patent Document 7: T. Collins, A J Lipton, T. Kanade, H. Fujiyoshi, D. Duggins, Y. Tsin, D. Tolliver, N. Enomoto, O. Hasegawa, P. Burt, and L. Wixson, A system for video surveillance and Monitoring, Carnegie Mellon University Robotics Institute Technical Report CMU-RI-TR-00-12, 2000.

SUMMARY OF THE INVENTION

It is an object of the present invention to provide a method capable of performing shadow removal efficiently with high speed calculation using HSV (Hue, Saturation, Value) color information for application to position recognition of a mobile robot.

Another object of the present invention is to provide a system capable of performing shadow removal efficiently with high speed calculation using HSV (Hue, Saturation, Value) color information for application to positional recognition of a mobile robot.

Further, it is to be understood that the present invention is not limited to the above-described subject matter, and another subject(s) not mentioned may be clearly understood by those skilled in the art from the following description.

As a solution to the problem to be solved by the present invention described above, a shadow removal method and system for surveillance camera-based mobile robot control according to a preferred embodiment of the present invention includes, a shadow removal system for surveillance camera-based mobile robot control including, a control unit for recognizing objects and obstacles in a surveillance camera image transmitted through a shadow removal technique, generating a movement path for traveling so the objects and obstacles are avoided, and generating control signals according to the movement paths to control components other than itself; a sensor unit for detecting a steering angle and a rotation of a driving motor to transmit to the control unit; a traveling unit for generating a driving force by the control signal; a steering unit operated to move along the movement path by the control signal; a communication unit for transmitting the image acquired from the surveillance camera to the control unit; and a power supply unit for supplying electric power to components other than itself, and a shadow removal method for surveillance camera-based mobile robot control including, detecting a binary image wherein a background from an original image acquired from indoor surveillance cameras installed adjacently has been removed; detecting an object region in a resultant image of the binary image detecting step using an HSV color space; and detecting a final object region where noise of the object region detected through shadow removal and threshold application is reduced.

In addition, the shadow removal system for the surveillance camera-based mobile robot control includes, an embodiment configured to further include a proximity sensor or a distance sensor on one external side of the shadow removal system, an embodiment in which the traveling unit is provided with a BLDC motor and the steering unit is provided with a stepping motor, an embodiments in which a communication unit capable of communicating with an external device such as a surveillance camera using various wireless communication protocols including Zigbee is provided, an embodiment in which the sensor unit is further provided with a camera or a visual sensor, and an embodiment in which the traveling unit is provided with moving means other than wheels.

The details of other embodiments are included in the "Detailed Description of the Invention" and the accompanying drawings.

The advantages and/or features of the present invention and the manner of achieving them will become apparent by reference to various embodiments described in detail below with reference to the accompanying drawings.

However, the present invention is not limited to the configurations of the embodiments described below, but may be embodied in various other forms, and each embodiment disclosed in this specification is intended to be illustrative only, and it will be understood by those of ordinary skill in the art that various changes in form and details may be made therein without departing from the spirit and scope of the invention as defined by the appended claims.

According to a preferred embodiment of the shadow removal method and system for surveillance camera-based mobile robot control of the present invention having the above-described configuration, by using HSV (Hue, Saturation, Value) color information, a method for efficiently removing shadows with high speed calculation may be provided.

According to a preferred embodiment of the shadow removal method and system for surveillance camera-based mobile robot control of the present invention having the above-described configuration, by using HSV (Hue, Saturation, Value) color information, a method for efficiently removing shadows with high speed calculation may be provided.

BRIEF DESCRIPTION OF THE DRAWINGS

FIGS. 2a and 2b are images with respect to a first step of a shadow removal method and system for surveillance camera-based mobile robot control according to a preferred embodiment of the present invention, where

FIGS. 3a and 3b are images with respect to a second step of a shadow removal method and system for surveillance camera-based mobile robot control according to a preferred embodiment of the present invention, where

FIGS. 4a and 4b are images wherein

FIGS. 6a and 6b are images with respect to a third step of a shadow removal method and system for surveillance camera-based mobile robot control according to a preferred embodiment of the present invention, wherein

DETAILED DESCRIPTION OF THE INVENTION

Exemplary embodiments of the present disclosure will be described in detail below with reference to the accompanying drawings.

Before describing the present invention in detail, terms and words used herein should not be construed in an ordinary or dictionary sense and should not be construed as limiting the invention to the inventors of the present invention in the best way possible, and it is to be understood that the concepts of various terms can be properly defined and used, and further, these terms and words should be construed as meaning and concept consistent with the technical idea of the present invention.

That is, the terms used herein are used only to describe preferred embodiments of the present invention, and are not intended to specifically limit the contents of the present invention, and it should be noted that this is a defined term considering that many possibilities of the present invention.

Also, in this specification, the singular forms "a", "an", and "the" include plural referents unless the context clearly dictates otherwise, and similarly it should be understood that even if they are expressed in plural they may include singular meaning.

Where a component is referred to as "comprising" another component throughout this specification, unless specified otherwise, this means the component does not exclude any other element but may further include any other element.

Further, when it is stated that an element is "inside or connected to another element", this element may be directly connected to another element or may be installed in contact with it, or may be installed spaced apart with a predetermined distance, and in the case where a component is installed to be spaced apart with a predetermined distance, a third component or means for fixing or connecting the component to another component may be present, and it should be noted that the description of the third component or means may be omitted.

On the other hand, it should be understood that there is no third component or means when an element is described as being "directly coupled" or "directly connected" to another element.

Likewise, other expressions that describe the relationship between the components, such as "between" and "right between ~", or "neighboring to" and "directly adjacent to" and such should be understood in the same spirit.

Further, in this specification, when terms such as "one surface", "other surface", "one side", "other side", "first", "second" and such are used, it is to clearly distinguish one component from another, and it should be understood that the meaning of the component is not limited by such term.

It is also to be understood that terms related to positions such as "top", "bottom", "left", "right" in this specification are used to indicate relative positions in the drawings for the respective components, and unless an absolute position is specified for these positions, it is not to be understood that these position-related terms refer to absolute positions.

Furthermore, in the specification of the present invention, the terms "part", "unit", "module", "device" and the like mean a unit capable of handling one or more functions or operations, and may be implemented as a hardware or software, or a combination of hardware and software.

In addition, in this specification, the same reference numerals are used for the respective constituent elements of the drawings, and the same constituent elements are denoted by the same reference numerals even if they are shown in different drawings, that is, the same reference numerals indicate the same components throughout this specification.

It is to be understood that the size, position, coupling relationships and such, of each component constituting the present invention in the accompanying drawings, may be partially exaggerated or reduced or omitted to be able to sufficiently clearly convey the scope of the invention or for convenience of describing, and therefore the proportion or scale thereof may not be rigorous.

Also, in the following description of the present invention, a detailed description of a configuration that is considered to unnecessarily obscure the gist of the present invention, for example, a known technology including the prior art, may be omitted.

Figure 1:
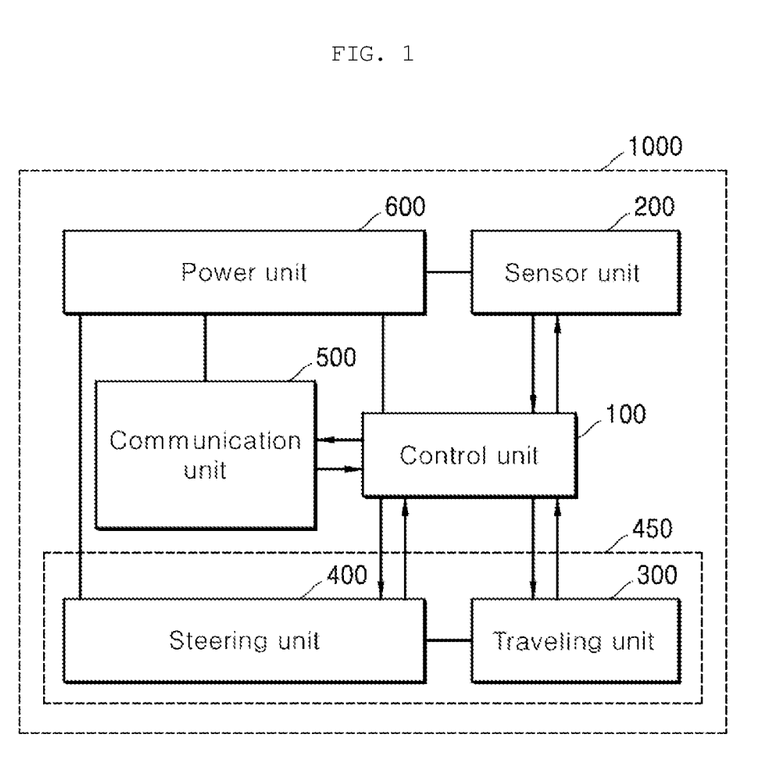
FIG. 1 is a block diagram schematically illustrating the configuration of a shadow removal system for surveillance camera-based mobile robot control according to a preferred embodiment of the present invention.

FIG. 1 is a block diagram schematically illustrating the configuration of a shadow removal system for surveillance camera-based mobile robot control according to a preferred embodiment of the present invention.

As shown in FIG. 1, a shadow removal system 1000 according to an exemplary embodiment of the present invention includes a control unit 100, a sensor unit 200, a traveling unit 300, a steering unit 400, a communication unit 500, and a power unit 600.

The control unit 100 is a component that controls the shadow removal system 1000 to drive and avoid obstacles by controlling the sensor unit 200, the traveling unit 300, the steering unit 400, and the communication unit 500, from the camera 500, that receives an image captured on a surveillance camera (not shown) from the communication unit 500 and removes the shadow included in the image, and recognizes an obstacle included in the image to configure a traveling path that enables the shadow removal system 1000 to travel so the obstacles are avoided to control the driving unit 450.

The sensor unit 200 refers to an encoder (not shown) provided in the traveling unit 300 for counting the rotation of a driving motor 360, and a turret encoder 420 provided in the steering unit 400 for measuring the steering angle. As an additional component of the sensor unit 200, it may further include a proximity sensor, a distance sensor, or the like.

Figure 8:
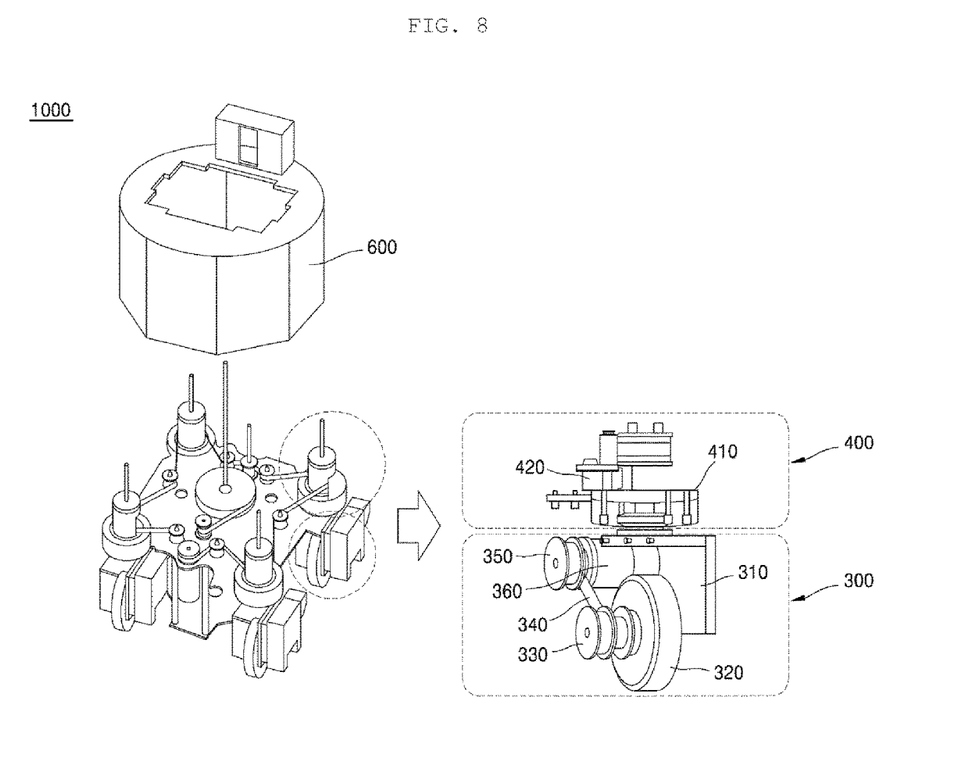
FIG. 8 is a block diagram schematically illustrating a mobile robot to which a shadow removal method and system for surveillance camera-based mobile robot control is applied, and a traveling unit thereof, according to a preferred embodiment of the present invention.

The traveling unit 300 is a portion in which the shadow removal system 1000 becomes the moving means and in the preferred embodiment of the present invention, it is configured to include a motor driver 310 and driving wheel 320, driving pulleys 330 and 350, a drive belt 340, and a drive motor 360 (see FIG. 8).

Here, the motor driver 310 controls rotation direction and the rotation amount of the drive motor 360 under the control of the control unit 100, and the driving wheel 320 which is directly coupled to the driving pulley 330 receives the driving force from the driving pulley 350 directly coupled to the driving motor 360 via the driving belt 340, thereby moving the shadow removal system 1000.

The steering unit 400 is configured to include a turret pulley 410, a turret encoder 420 and a turret motor (not shown)(see FIG. 8), and functions to steer the steering direction of the shadow removal system through the rotation of the turret motor.

The driving unit 450 refers to the driving unit 300 and the steering unit 400 and refers to the portion that functions to move the shadow removal system 1000.

The communication unit 500 functions to receive an image taken by a surveillance camera (not shown) from the surveillance camera and transfers it to the control unit 100. Here, it is preferable to use a Zigbee method as a communication protocol between the surveillance camera and the communication unit 500. However, a communication protocol other than Zigbee may be applied depending on the purpose of the embodiment, the embodiment environment, and the like.

The power unit 600 functions to supply power to the components other than itself, that is, the control unit 100, the sensor unit 200, the traveling unit 300, the steering unit 400, and the communication unit 500. The control unit 100 and the sensor unit 200, the steering unit 400 and the communication unit 500 are directly connected to the power unit 600 to receive power. The traveling unit 300 is not directly connected to the power unit 100, and is implemented to be connected to the steering unit 400 to receive power. Of course, depending on the embodiment, the driving unit 300 may be implemented to be directly connected to the power supply unit 100 to receive power.

The shadow removal system 1000 includes a control unit 100, a sensor unit 200, a traveling unit 300, a steering unit 400, a communication unit 500, and a power unit 600, and preferably will be implemented in the form of a mobile robot that can travel while avoiding obstacles.

In addition, through a configuration further including a proximity sensor or a distance sensor on a side surface of the exterior of the shadow removal system for surveillance camera-based mobile robot control according to a preferred embodiment of the present invention, the distance between the shadow removal system and the mobile robot and the obstacle may be measured, or may be configured to detect that the shadow removal system and the mobile robot are close to the obstacle.

Further, it is possible to increase the service life of the traveling unit and to improve the fine steering capability of the steering unit through the provision of a BLDC motor in the traveling unit and a stepping motor in the steering unit.

Further, in the embodiment of the present invention, the shadow removal system for surveillance camera-based mobile robot control according to the preferred embodiment of the present invention has been described and shown as a using wheels as its means of moving, but the moving means of a robot with the shadow removal method and system of the present invention applied thereto is not limited to wheels, and the shadow removal method and system of the present invention may be applied to robots using other moving means such as a caterpillar or legs for walking.

Further, although the control unit 100 is shown to not send a control signal to the power unit 600 in FIG. 1, it can be implemented in a form where the control unit 100 sends a control signal to the power unit 600 to control power supplied to respective components.

In addition, the active range of the shadow removal system and the mobile robot according to the present invention can be extended not only indoors but also outdoors through a configuration further including a camera or a visual sensor in the sensor unit 200.

In addition, referring to the lines connecting the respective components in FIG. 1, the lines that do not have arrows at one end are power lines, which represent lines for supplying power generated by the power unit to each component, the lines having arrows at one end are lines indicating the direction of transmission of a control signal or the direction of data transmission generated in the control unit 100 and indicates that out of the two end parts of a line, the control signal or data is transmitted from a component connected to an end part of the line without an arrow, to a component connected to the end part with the arrow.

Hereinafter, a shadow removal method and system for surveillance camera-based mobile robot control according to a preferred embodiment of the present invention will be described in detail with reference to FIG. 2 to FIG. 10.

The shadow removal method for surveillance camera-based mobile robot control according to a preferred embodiment of the present invention includes three steps of a background removed binary image detection step, an object region detection step, and a final object region detection step.

Figure 2A:
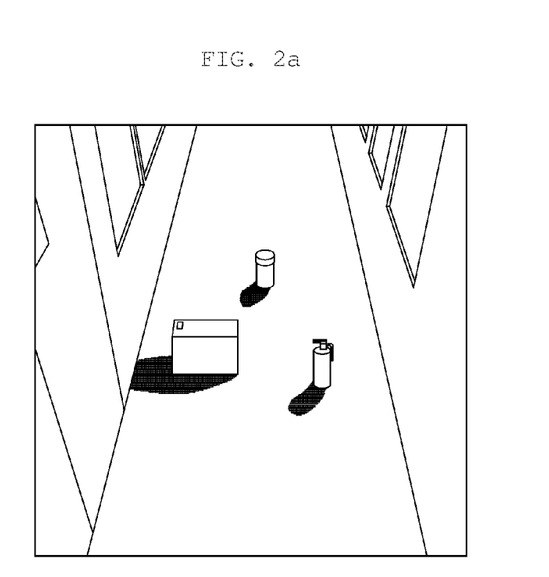
FIG. 2a is an image obtained from an indoor surveillance camera.
Figure 2B:
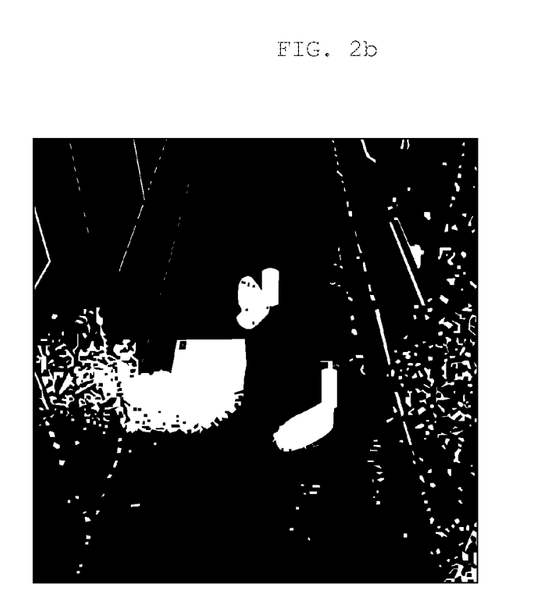
FIG. 2b is a binary image after background removal.

FIGS. 2a and 2b are images with respect to a first step of a shadow removal method and system for surveillance camera-based mobile robot control according to a preferred embodiment of the present invention, where FIG. 2a is an image obtained from an indoor surveillance camera, and FIG. 2b is a binary image after background removal.

First, a background removed binary image D(x, y) is obtained as shown in FIG. 2b by applying the following Equation 1 to the image obtained from the indoor surveillance camera shown in FIG. 2a.

$$D(x, y) = \begin{cases} 1, \text{ if } |I_B(x, y) - I_C(x, y)| > th \\ 0, \text{ otherwise} \end{cases} \quad \text{[Equation 1]}$$

$I_B$ and $I_C$ are respectively the background image and the original image by the indoor surveillance camera. Here, 50 was applied as the threshold value th, which was determined from previous experiments, and according to objective and needs, a value other than 50 may be applied.

Figure 3A:
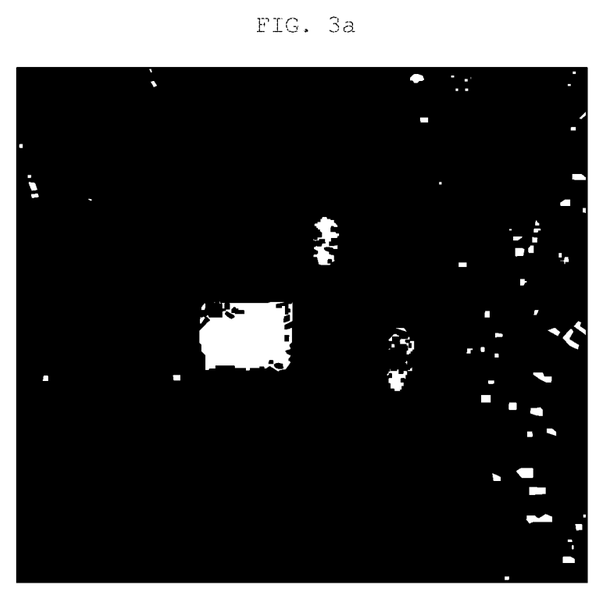
FIG. 3a is an SS-binary image of background removal of S space.
Figure 3B:
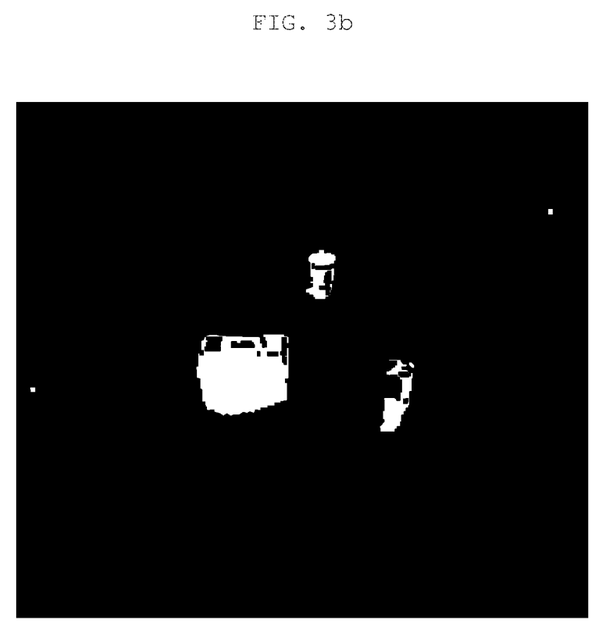
FIG. 3b is a DV-binary image of background removal of V space.

FIGS. 3a and 3b are images with respect to a second step of a shadow removal method and system for surveillance camera-based mobile robot control according to a preferred embodiment of the present invention, where FIG. 3a is an SS-binary image of background removal of S space, and FIG. 3b is a DV-binary image of background removal of V space.

The second step of the shadow removal method for the surveillance camera-based mobile robot control according to the preferred embodiment of the present invention is the step of detecting the object region by using a HSV color space. In the HSV color space, the H, S, and V spaces are divided into corresponding images. Since the image from the H space is unstable, the S and V attributes are used for shadow detection. FIGS. 3a and 3b are object regions detected using the S, V attributes of the HSV color space, respectively.

$$SS(x, y) = \begin{cases} 1, \text{ if } |F_C^S(x, y) - F_B^S(x, y)| \geq th_S \\ 0, \text{ otherwise} \end{cases} \quad \text{[Equation 2]}$$

$F_C^S$ refers to an S channel of an input image, and $F_B^S$ refers to an S channel of the background image.

$$DV(x, y) = \begin{cases} 1, \text{ if } \left|\dfrac{F_C^V(x, y)}{F_B^V(x, y)}\right| \leq th_V \\ 0, \text{ otherwise} \end{cases} \quad \text{[Equation 3]}$$

$F_C^V$ refers to a V channel of the input image, $F_B^V$ refers to a V channel of the background image.

The SS(x, y) of Equation 2 is a binary image obtained through the threshold operation of Equation 2 on the background image of FIG. 1a and the image of the S region of the HSV space.

The value region of the HSV color space is a binary image obtained through a threshold operation of Equation 3 related to the ratio between the background image and the value region.

The images of object regions of S and V channels are as shown in FIG. 3.

Here, the threshold value $th_S$ of Equation 2 used for the S image of FIG. 3a is 35, and the threshold value $th_V$ of Equation 3 used for the V image of FIG. 3b is 1. Here, the determined threshold values are those determined from previous experiments. In the experiment, the shadow region of the S image is smaller than the shadow region of the V image but has an unstable boundary characteristic. In other words, the V image has a larger shadow effect than the S image, but is more stable.

Figure 4A:
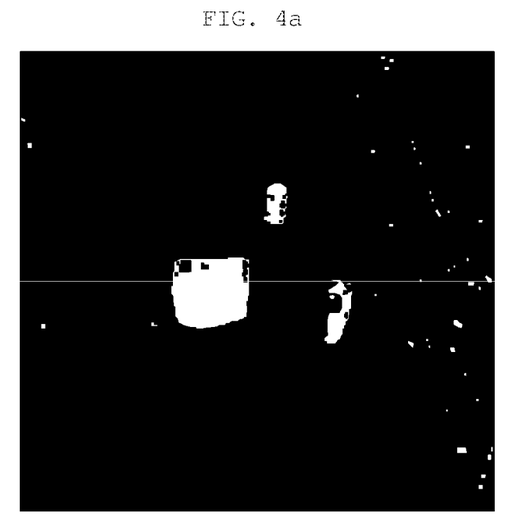
FIG. 4a is an object region image and FIG. 4b is a shadow mask image of a shadow removal method and system for surveillance camera-based mobile robot control according to a preferred embodiment of the present invention.
Figure 4B:
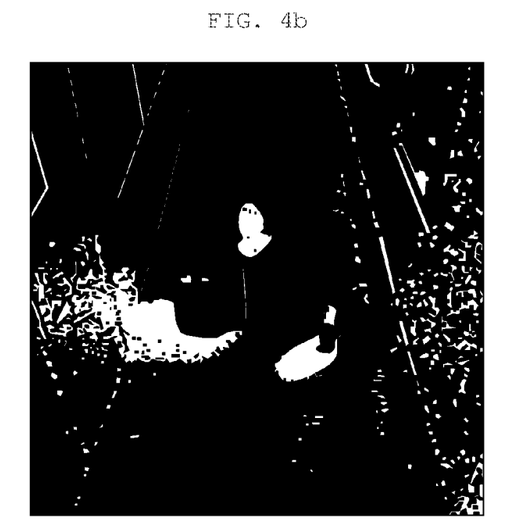

FIGS. 4a and 4b are images wherein FIG. 4a is an object region image and FIG. 4b is a shadow mask image of a shadow removal method and system for surveillance camera-based mobile robot control according to a preferred embodiment of the present invention.

Equation 4 and Equation 5 are equations for compensating an object region, and Equation 4 and Equation 5 are applied to obtain the result as shown in FIG. 4a.

$$M(x, y) = SS(x, y) + DV(x, y) \quad \text{[Equation 4]}$$

$$\text{Object Area}(x, y) = \begin{cases} 1, \text{ if } M(x, y) = 1 \\ 0, \text{ otherwise} \end{cases} \quad \text{[Equation 5]}$$

A shadow mask image SM(x,y) is an image as shown in the following Equation 6, obtained by removing the object region image of Equation 5 from D(x,y) of Equation 1.

$$SM(x,y)=D(x,y)-\text{Object Area}(x,y) \quad \text{[Equation 6]}$$

Figure 5:
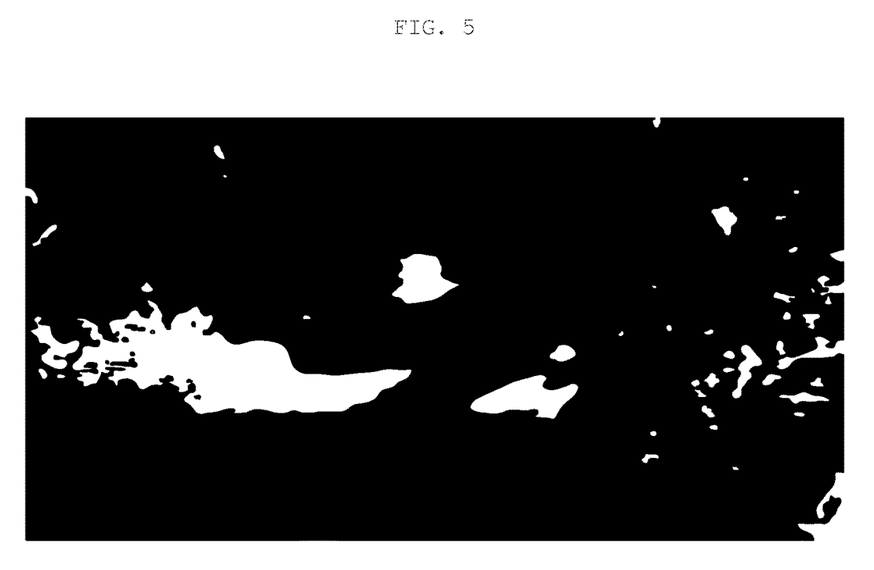
FIG. 5 is a shadow mask image by the application of a median filter, of a shadow removal method and system for surveillance camera-based mobile robot control according to a preferred embodiment of the present invention.

FIG. 5 is a shadow mask image by the application of a median filter, of a shadow removal method and system for surveillance camera-based mobile robot control according to a preferred embodiment of the present invention.

The shadow mask image is in a state where the object image is removed but noise is still included. By removing the noise element, and for obtaining a stable shadow region, applying a 7×7 median filter to the shadow mask image, a shadow mask image like FIG. 5 is obtained.

Figure 6A:
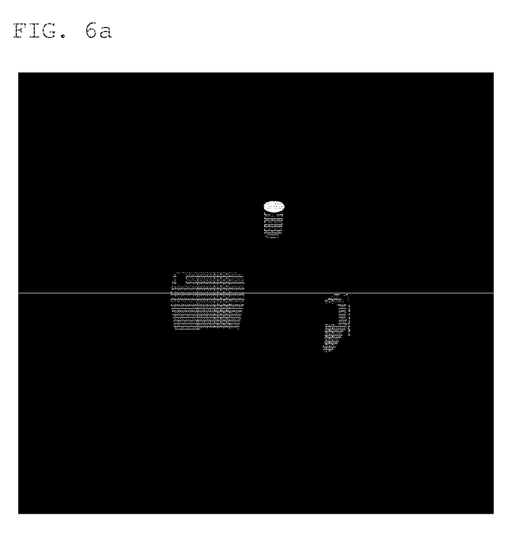
FIG. 6a is a background removed SR image.
Figure 6B:
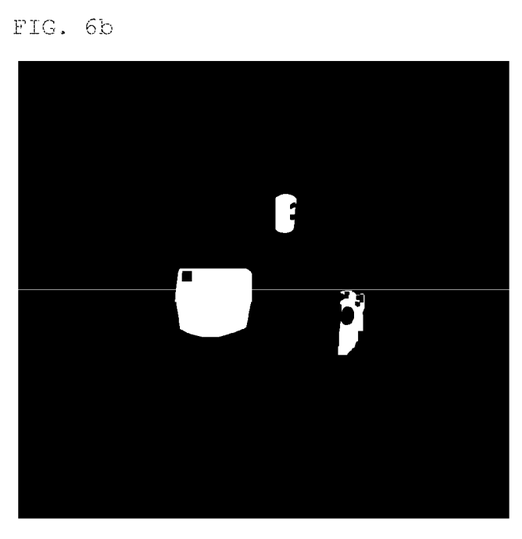
FIG. 6b is a binary image by applying a threshold value.

FIGS. 6a and 6b are images with respect to a third step of a shadow removal method and system for surveillance camera-based mobile robot control according to a preferred embodiment of the present invention, wherein FIG. 6a is a background removed SR image, and FIG. 6b is a binary image by applying a threshold value.

The third step is a step of shadow removal in which an input image from the surveillance camera is restored, wherein an object region that may finally be reliable is detected, and shadow removal is performed through the following Equation 7.

$$SR(x, y) = \begin{cases} I_B(x, y), \text{ if } SM(x, y) = 1 \\ I_C(x, y), \text{ otherwise} \end{cases} \quad \text{[Equation 7]}$$

$I_B$ and $I_C$ are respectively grayscale images of the background image and the original image obtained from the surveillance camera.

The following Equation 8 is an equation for minimizing the noise of the object region of FIG. 4a, wherein by removing the background image $I_B$ from the shadow-removed image SR(x,y) of Equation 7, only the object region remains. In addition, with the application of a threshold value, a more modified object region image may be obtained, and the result is as shown in FIG. 6.

$$OD(x,y)=|SR(x,y)-I_B(x,y)|\geq th_{OD} \quad \text{[Equation 8]}$$

Figure 7:
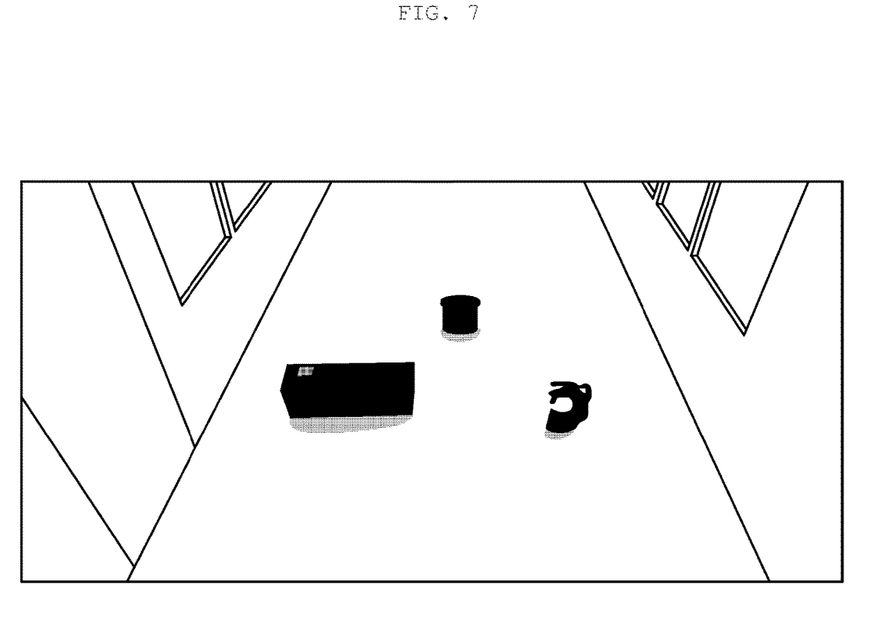
FIG. 7 is a shadow-removed image of FIG. 2a by a shadow removal method and system for surveillance camera-based mobile robot control according to a preferred embodiment of the present invention.

FIG. 7 is a shadow-removed image of FIG. 2a by a shadow removal method and system for surveillance camera-based mobile robot control according to a preferred embodiment of the present invention.

FIG. 7 shows results of a shadow removal method and system for surveillance camera-based mobile robot control according to a preferred embodiment of the present invention, and it can be seen that the shadow region of the object included in FIG. 2*a* is cleanly removed.

Further, according to a shadow removal method and system for surveillance camera-based mobile robot control according to a preferred embodiment of the present invention, the time required for one cycle is about 55 milliseconds, which means 18 frames per second.

The experiment is to show that a shadow removal method for controlling a mobile robot by using two indoor surveillance cameras is effective according to a preferred embodiment of the present invention. The size of the floor area observed by two neighboring cameras is 2.2 meters wide and 6 meters long.

FIG. 8 is a block diagram schematically illustrating a partial enlargement of a mobile robot to which a shadow removal method and system for surveillance camera-based mobile robot control is applied, and a traveling unit thereof, according to a preferred embodiment of the present invention, and the description for the mobile robot and its traveling unit is included in the description of the above-mentioned FIG. 1.

In addition, the surveillance camera has a resolution of 320×240 pixels and three channels of RGB, and the neighboring camera is used for the position recognition of the mobile robot. However, it should be understood by those skilled in the art that the specification of a surveillance camera that can be used in the practice of the present invention is not necessarily limited to the above.

Figure 9:
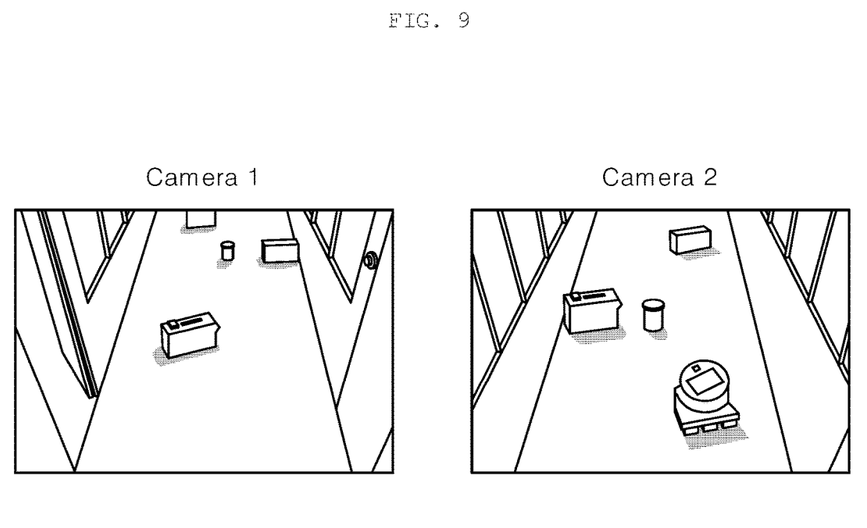
FIG. 9 is an image taken with a surveillance camera for an experimental environment for the verifications of a shadow removal method and system for surveillance camera-based mobile robot control according to a preferred embodiment of the present invention.

FIG. 9 is an image taken with a surveillance camera for an experimental environment for the verifications of a shadow removal method and system for surveillance camera-based mobile robot control according to a preferred embodiment of the present invention, and a number of objects are set on the floor. The mobile robot is controlled to move from one position to another.

At this time, through the shadow removal method for surveillance camera-based mobile robot control, which is described with reference to FIGS. 2 to 7 and Equations 1 to 8, the mobile robot detects the objects placed on the floor as object regions to recognize them as obstacles and determines the movement route.

Figure 10:
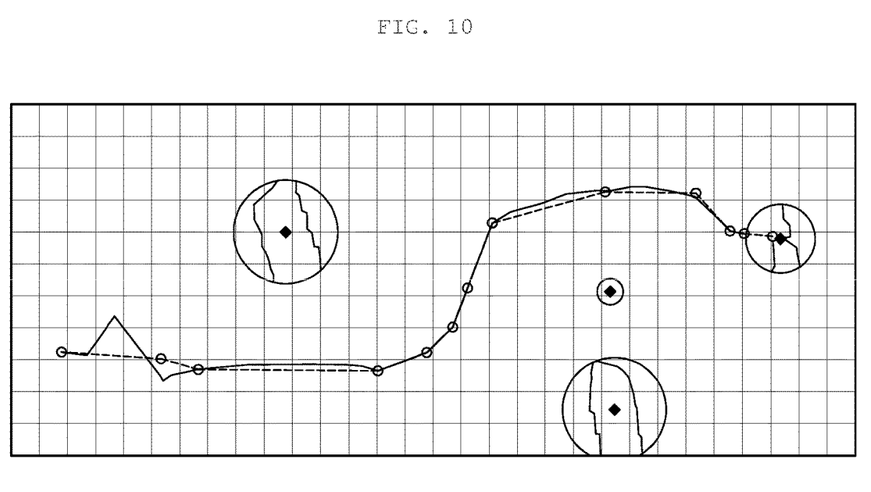
FIG. 10 is a diagram illustrating a path control experiment result of a mobile robot to which a shadow removal method and system for surveillance camera-based mobile robot control according to a preferred embodiment of the present invention is applied.

FIG. 10 is a diagram illustrating a path control experiment result of a mobile robot to which a shadow removal method and system for surveillance camera-based mobile robot control according to a preferred embodiment of the present invention is applied, wherein the error boundary between a path planned by the mobile robot to which the shadow removal method and system for surveillance camera-based mobile robot control according to a preferred embodiment of the present invention is applied and the path that the mobile robot actually moves is ±5 centimeters.

While the present invention has been particularly shown and described with reference to exemplary embodiments thereof, it is evident that many alternatives, modifications and variations will be apparent to those skilled in the art. It will be understood by those skilled in the art that various changes in form and details may be made therein without departing from the spirit and scope of the invention as defined by the appended claims.

In addition, since the present invention can be embodied in various forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

What is claimed is:

1. A shadow removal system for surveillance camera-based mobile robot control comprising,
a control unit for recognizing objects and obstacles in a surveillance camera image transmitted through a shadow removal technique, generating movement paths for traveling so the objects and obstacles are avoided, and generating control signals according to the movement paths to control components other than itself;
a sensor unit for detecting a steering angle and a rotation of a driving motor to transmit to the control unit;
a traveling unit for generating a driving force by the control signal;
a steering unit operated to move along the movement paths by the control signal;
a communication unit for transmitting the image acquired from the surveillance camera to the control unit; and
a power supply unit for supplying electric power to components other than itself;
wherein the sensor unit comprises:
an encoder provided in the traveling unit for counting the rotation of the driving motor; and
a turret encoder provided in the steering unit for measuring the steering angle, and
wherein the steering unit comprises a turret pulley, the turret encoder, and a turret motor which is directly coupled to the turret pulley to transmit a rotating force from the turret pulley to the turret encoder.

2. The system of claim 1, further comprising a proximity sensor or a distance sensor for detecting the proximity of the obstacle or for measuring the distance to the obstacle.

3. The system of claim 1, wherein the traveling unit is provided with a BLDC motor and the steering unit is provided with a stepping motor.

4. The system of claim 1, wherein a communication protocol applied to the communication unit is a Zigbee wireless communication protocol.

5. The system of claim 1, wherein the communication unit is characterized in that a plurality of wireless communication protocols are used simultaneously.

6. The system of claim 1, wherein the traveling unit is provided with a wheel or a caterpillar or a leg for walking as a moving means.

7. The system of claim 1, wherein the sensor unit further comprises a camera or a visual sensor.

8. The system of claim 2, wherein the sensor unit further comprises a camera or a visual sensor.

9. The system of claim 3, wherein the sensor unit further comprises a camera or a visual sensor.

10. The system of claim 4, wherein the sensor unit further comprises a camera or a visual sensor.

11. The system of claim 5, wherein the sensor unit further comprises a camera or a visual sensor.

12. The system of claim 6, wherein the sensor unit further comprises a camera or a visual sensor.

* * * * *